US011518910B2

(12) United States Patent
McCurdy (10) Patent No.: US 11,518,910 B2
(45) Date of Patent: Dec. 6, 2022

(54) BIO-BASED ADDITIVE FOR ASPHALT

(71) Applicant: POET Research, Inc., Sioux Falls, SD (US)

(72) Inventor: Alex T. McCurdy, Sioux Falls, SD (US)

(73) Assignee: POET Research, Inc., Sioux Falls, SD (US)

( * ) Notice: Subject to any disclaimer, the term of this patent is extended or adjusted under 35 U.S.C. 154(b) by 330 days.

(21) Appl. No.: 16/661,469

(22) Filed: Oct. 23, 2019

(65) Prior Publication Data

US 2020/0131403 A1    Apr. 30, 2020

Related U.S. Application Data

(60) Provisional application No. 62/750,487, filed on Oct. 25, 2018.

(51) Int. Cl.
| | | |
|---|---|---|
| *C09D 195/00* | (2006.01) | |
| *C09D 191/00* | (2006.01) | |
| *E04D 1/22* | (2006.01) | |
| *E04D 1/16* | (2006.01) | |
| *E04D 1/20* | (2006.01) | |
| *C08L 95/00* | (2006.01) | |

(52) U.S. Cl.
CPC ............ *C09D 195/00* (2013.01); *C08L 95/00* (2013.01); *C09D 191/00* (2013.01); *E04D 1/16* (2013.01); *E04D 1/20* (2013.01); *E04D 1/22* (2013.01); *C08L 2555/34* (2013.01); *C08L 2555/64* (2013.01)

(58) Field of Classification Search
CPC ...... C09D 195/00; C09D 191/00; E04D 1/16; E04D 1/20; E04D 1/22
See application file for complete search history.

(56) References Cited

U.S. PATENT DOCUMENTS

| | | |
|---|---|---|
| 8,608,845 B2 | 12/2013 | Naidoo et al. |
| 8,765,985 B2 | 7/2014 | Hora et al. |
| 9,181,456 B2 | 11/2015 | Hong et al. |
| 9,416,274 B2 | 8/2016 | Frank |
| 9,481,794 B2 | 11/2016 | Cox |
| 9,540,544 B2 | 1/2017 | Kalkanoglu et al. |
| 9,688,882 B2 | 6/2017 | Quinn et al. |
| 10,167,390 B2 | 1/2019 | Cox |
| 10,336,906 B2 * | 7/2019 | Lewandowski ......... E04D 11/02 |
| 10,384,958 B2 | 8/2019 | Tran et al. |
| 2008/0314294 A1 | 12/2008 | White et al. |
| 2009/0137705 A1 | 5/2009 | Faucon Dumont et al. |
| 2010/0034586 A1 | 2/2010 | Bailey et al. |

(Continued)

OTHER PUBLICATIONS

Bailey (2012) "The use of vegetable oil as a rejuvenator for asphalt mixtures" 5th Euroasphalt & Eurobitume Congress Jun. 13-15, 2012 Instanbul A5EE-161.

(Continued)

*Primary Examiner* — Nathan L Van Sell
(74) *Attorney, Agent, or Firm* — Honigman LLP (57) ABSTRACT

Compositions comprising asphalt and corn oil are provided, as are the shingles made using the compositions, methods for making the compositions, and methods for making the shingles. The compositions comprise mixtures of asphalt and corn oil, and the mixtures are oxidized to attain desirable properties.

19 Claims, 3 Drawing Sheets

(56) References Cited

U.S. PATENT DOCUMENTS

| | | |
|---|---|---|
| 2012/0060722 A1 | 3/2012 | Montpeyroux et al. |
| 2014/0230693 A1 | 8/2014 | Gonzalez Leon et al. |
| 2015/0259506 A1* | 9/2015 | Lewandowski ........... C10C 3/04 |
| | | 106/246 |
| 2016/0053150 A1* | 2/2016 | Croteau .................... B32B 5/16 |
| | | 428/143 |
| 2018/0080180 A1 | 3/2018 | Kurth et al. |

OTHER PUBLICATIONS

Bailey (2012) "The use of vegetable oil in asphalt mixtures, in the laboratory and field" 5th Euroasphalt & Eurobitume Congress Jun. 13-15, 2012 Instanbul A5EE-162.

Bailey (2011) "Novel uses of vegetable oil in asphalt mixtures" ("Bailey Thesis") Retrieved from: http://ethos.bl.uk/OrderDetails.do?uin=uk.bl.ethos.532999; pp. 1-340.

Moghaddam et al. (2016) "The use of rejuvenating agents in production of recycled hot mix asphalt: A systematic review" Construction and Building Materials 114:805-816.

Winkler-Moser et al. (2011) "Composition and oxidative stability of crude oil extracts of corn germ and distillers grains" Industrial Crops and Products 33:572-78.

Zaumanis et al. (2014) "Influence of six rejuvenators on the performance properties of reclaimed asphalt pavement (RAP) binder and 100% recycled asphalt mixtures" Cons Build Mat 71: 538-550.

Zaumanis et al. "Use of rejuvenators for production of sustainable high content rap hot mix asphalt" XXVIII International Baltic Road Conference pp. 1-10.

* cited by examiner

BIO-BASED ADDITIVE FOR ASPHALT

CROSS-REFERENCE TO RELATED APPLICATIONS

This application claims priority under 35 U.S.C. 119(e) to U.S. Provisional Patent Application Ser. No. 62/750,487, filed Oct. 25, 2018, the disclosure of which is hereby incorporated by reference in its entirety.

FIELD

This disclosure relates to compositions for coating shingles, shingles coated with the compositions, and methods for making such compositions for use in roofing applications.

BACKGROUND

Asphalt used in making shingles is an end-product of oil refining and, although somewhat similar in origin to road asphalt, is processed in such a manner as to provide characteristics important for asphalt shingle performance. The processing step is referred to as oxidizing with hot air (or blowing) and must be precise—if oxidizing is performed for too long or at too high of temperatures, the shingles can be brittle; if not processed long enough or at a temperature too low, the shingles may be soft. Additives can be mixed with the asphalt to increase weather resistance and enable the shingle to meet the industry standards for resistance to fire hazards. The asphalt coating is applied to the tops and bottoms of organic felt or fiberglass, then stone granules are applied to the asphalt coating. Organic felt mats are made of cellulose fibers obtained from recycled waste paper or wood.

Shingle producers typically must use asphalt of higher quality that oxidizes to meet specifications at a higher cost relative to paving asphalt. Some petroleum-based additives such as Re-refined Engine Oil Bottoms (REOB) can be used to improve rheological characteristics of asphalt, but the resulting shingle coating typically exhibits poor weathering performance.

U.S. Pat. No. 9,688,882 mentions use of modified vegetable oil as an additive to post-oxidation asphalt.

U.S. Pat. No. 9,540,544 mentions a mixture of bio-based material and asphalt.

U.S. Pat. No. 9,181,456 mentions forming a bio-asphalt after treating a vegetable oil with a catalyst and heat prior to addition to asphalt.

U.S. 2018/0080180 mentions polymerizing a vegetable oil by blowing which can later be added to asphalt.

There is a need to identify and explore alternative shingle coating compositions which satisfy the industry standards.

BRIEF SUMMARY

Provided herein are shingle coating compositions comprising an oxidized mixture of asphalt and about 0.1% to about 10% by weight corn oil. In some embodiments, the composition comprises an additive.

The shingle coating composition can have a penetration value of at least about 15 dmm and/or a softening point between about 190° F. and about 235° F. In some aspects, the shingle coating composition has a penetration value of about 17 dmm and/or a softening point of about 211° F. In some aspects, the shingle coating composition exhibits a reduced viscosity relative to a shingle coating composition without corn oil. In some aspects, the flashpoint of the shingle coating composition is reduced no more than about 10%, or no more than about 5%, relative to a shingle coating composition without corn oil.

Provided herein are shingles comprising a base and a coating on the base. The coating comprises an oxidized mixture of asphalt and about 0.1% to about 10% by weight corn oil. The base can be fiberglass sheets, organic felts, ceramic fiber base, or polymer fiber material.

In some aspects the shingle exhibits a reduction in mass loss relative to a shingle comprising a coating without corn oil when subjected to accelerated weathering by Xenon Arc Weatherometer according to ASTM G155 for 3000 hours.

Provided herein are compositions comprising a mixture of pre-oxidized asphalt and about 0.1% to about 10% by weight corn oil.

Also provided herein are methods for forming a shingle coating composition. The methods comprise:
  (i) adding about 0.1% to about 10% corn oil to asphalt to form a mixture;
  (ii) preheating the mixture to a temperature of about 325° F. to about 350° F.;
  (iii) stirring the mixture under low shear (paddle agitation); and
  (iv) oxidizing the mixture to a desired softening point.

In some aspects, the mixture is stirred for about an hour, or about 30 minutes, or about 2 hours. In some aspects, the step of oxidizing is performed at about 500° F. In some aspects, the oxidation time for 1% inclusion of corn oil is about four hours. In some aspects, the oxidation time for 3% corn oil inclusion is about three hours.

Shingle coating compositions prepared according to the methods provided herein can have a softening point between about 190° F. and about 235° F. Shingle coating compositions prepared according to the methods provided herein can have a penetration value of at least about 15 dmm. In some aspects, the shingle coating composition has a penetration value of about 17 dmm and softening point of about 211° F. In some aspects, the shingle coating composition exhibits a reduced viscosity relative to a shingle coating composition without corn oil. In some aspects, the flashpoint of the shingle coating composition is reduced no more than about 5%, or no more than about 10%, relative to a shingle coating composition without corn oil.

Also provided herein are methods for forming a shingle. The methods comprise:
  (i) coating a base with a shingle coating composition comprising an oxidized mixture of asphalt and about 0.1% to about 10% by weight corn oil; and
  (ii) applying granular stone to the shingle coating composition.

The base can be fiberglass sheets, organic felts, ceramic fiber base, or polymer fiber material.

In some aspects, the granular stone can be selected from the group consisting of copper, andesite, boehmite, coal slag, diabase, metabasalt, nephaline syenite, quartzite, rhyodacite, rhyolite, river gravel, mullite-containing granules, sintered ceramic particles, and/or other suitable materials.

Other objects and advantages will become apparent from a review of the ensuing detailed description

DESCRIPTION

It is to be understood that this invention is not limited to particular compositions, methods, and experimental conditions described, as such methods and conditions may vary. It is also to be understood that the terminology used herein is for the purpose of describing particular embodiments only, and is not intended to be limiting, since the scope of the present invention will be limited only by the appended claims.

As used in this specification and the appended claims, the singular forms "a", "an", and "the" include plural references unless the context clearly dictates otherwise. Thus, for example, a reference to "a method" includes one or more methods, and/or steps of the type described herein and/or which will become apparent to those persons skilled in the art upon reading this disclosure and so forth.

The word "exemplary" is used to mean serving as an example, instance, or illustration. Any embodiment or design described as "exemplary" is not necessarily to be construed as preferred or advantageous over other embodiments or designs, nor is it meant to preclude equivalent exemplary structures and techniques known to those of ordinary skill in the art. Rather, use of the word exemplary is intended to present concepts in a concrete fashion, and the disclosed subject matter is not limited by such examples.

The term "or" is intended to mean an inclusive "or" rather than an exclusive "or." To the extent that the terms "comprises," "has," "contains," and other similar words are used in either the detailed description or the claims, for the avoidance of doubt, such terms are intended to be inclusive in a manner similar to the term "comprising" as an open transition word without precluding any additional or other elements.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All patents, applications and non-patent publications mentioned in this specification are incorporated herein by reference in their entireties.

In a conventional ethanol plant, corn is used as a feedstock and ethanol is produced by fermentation of the starch contained within the corn. The fermentation product includes ethanol, water, and soluble components as well as residual unfermented particulate matter (among other things). The fermentation product is distilled and dehydrated to recover ethanol. The residual matter (e.g., whole stillage) comprising water, soluble components, oil, and unfermented solids can be further processed to separate out desirable fermentation by-products, for example, corn oil.

Corn oil from the fermentation product can be recovered from fermentation residue according to conventional processes, e.g., extracted post-fermentation as a co-product of dry grind ethanol production. Corn oil can also be provided from fermentation residue by adjusting the pH of the corn fermentation residue to provide a corn oil layer and an aqueous layer; and separating the corn oil layer from the aqueous layer. Corn obtained in such methods can be useful in the asphalt compositions and shingles, and the methods of making the same, as described herein.

Likewise, corn oil obtained from other sources, e.g. oil extracted from corn germ as a co-product of corn wet milling, is also useful in the asphalt compositions and shingles, and the methods of making the same, as disclosed herein. Germ corn oil is typically extracted by physical pressing, hexane extraction, or a combination of the two processes.

Roofing fluxes and/or paving grade asphalt used in the shingle coating manufacturing process vary in quality, price, and accessibility. To meet shingle coating specification criteria, roofing or paving asphalt is processed through an oxidizer which exposes the asphalt to air at high temperatures. It has been determined herein that incorporation of additives such as corn oil with the asphalt can improve the rheological characteristics of asphalts that would otherwise fail to meet specification requirements, such as a minimum penetration value of 15 dmm and a softening point between about 190° F. and about 235° F.

A "penetration value" characterizes the consistency of semi-solid asphalts such as those used in shingles, and is measured by depth a 100 gauge needle at 25° C. (77° F.) penetrates into the asphalt. The less viscous the asphalt, the deeper the needle will penetrate. Penetration depth is roughly correlated with asphalt binder performance.

Addition of corn oil to asphalt prior to oxidation of shingle flux (also known as blowing) can improve the penetration while not reducing the softening point substantially. Its use as an additive can alter the chemical composition of the asphalt such that the penetration and softening point relationship changes in a favorable way not observed with post-oxidation addition. Incorporation of corn oil also decreases the viscosity of the shingle coating which can significantly improve plant processing.

Viscosity is a measure of the shingle coating's resistance to flow, essentially the relationship of shear stress to the shear rate of the coating composition. In some aspects, a shingle coating exhibits a melt viscosity at 400° F. of 150 cps to 450 cps. Absolute viscosity reflects the time it takes for a fixed volume of asphalt binder to be drawn up through a capillary tube by means of vacuum, under closely controlled conditions of vacuum and temperature. Equiviscous temperature (EVT) is the temperature at which the viscosity of the asphalt is 125 cP. In some aspects, the absolute viscosity is about 0.7 Pa-s at 375° F. with 1% corn oil, or about 0.4 Pa-s at 375° F. with 3% corn oil; is about 0.4 Pa-s at 400° F. with 1% corn oil, or about 0.3 Pa-s at 400° F. with 3% corn oil; or is about 0.3 Pa-s at 425° F. with 1% corn oil, or about 0.2 Pa-s at 425° F. with 3% corn oil. In some aspects, the viscosity is reduced relative to a shingle coating composition without corn oil.

The flash point of a shingle coating is the lowest liquid temperature at which application of a test flame causes the vapors of the sample to ignite. In some aspects, the flashpoint of the coating is greater than 550° F., or reduced no more than about 10%, or nor more than about 5%, relative to the flashpoint of a coating without corn oil.

As such, provided herein are compositions comprising asphalt oxidized along with corn oil for use as a shingle coating. The oxidized shingle coating can be used to coat a base material such as fiberglass sheets, organic felts, ceramic fiber base, or polymer fiber material before applying stone granules on one or both sides of the shingle. A sealant can be applied to the shingle coating. Other surface coatings are contemplated herein and include algaecides or other biocides, polymeric binders, materials with solar reflective properties, pigments, etc. The coated material is cut to specification for the final shingle product.

In some embodiments, the compositions are shingle coating compositions comprising an oxidized mixture of asphalt and about 0.1% to about 10% by weight corn oil. In some embodiments, the composition comprises an additive.

Also provided herein are compositions comprising a mixture of pre-oxidized asphalt and about 0.1% to about 10% by weight corn oil. In other words, the asphalt is oxidized prior to the addition of corn oil.

As used herein the term "asphalt" is meant to refer to asphalts produced from petroleum refining, including residual from atmospheric distillation, from vacuum distillation, and from solvent de-asphalting units, and asphalt from recycled asphalt streams such as re-refined motor oil bottoms. Mixtures of different asphalts are also contemplated. Natural bitumen is also contemplated herein. Asphalt contains high molecular weight hydrocarbon species, i.e., asphaltenes, dispersed in a medium called maltenes, the latter of which is a mixture of resins and oils. The resins contain unsaturated cyclic groups causing them to behave as adhesives, the oils are responsible for fluidity, while the asphaltenes generally perform as filler.

Corn oil can be present in the asphalt/corn oil composition in an amount of about 0.1 to about 10% by weight, or about 0.1%, about 0.5%, about 0.8%, about 1%, about 2%, about 3%, about 4%, about 5%, about 6%, about 7%, about 8%, about 9%, or about 10%. Asphalt makes up the difference in the amount of the total composition. In some embodiments, the corn oil is obtained as a by-product of fermentation of corn feedstock in the production of bio-ethanol. In some aspects, the corn oil has specific characteristics reflective of the process by which it was obtained. For example, the corn oil can contain relatively low free fatty acids and/or can contain relatively high fatty acid alkyl esters.

In some aspects, the corn oil contains relatively low free fatty acids. In some aspects, the corn oil contains free fatty acid in an amount less than about 15% w/w, for example, about 0.1% to about 15% w/w, about 0.5% to about 9% w/w, or about 5% to about 9% w/w, about 15% w/w, about 12.5% w/w, about 10% w/w, about 8% w/w, about 7.5% w/w, about 5% w/w, or about 2.5% w/w. In some aspects, the corn oil contains less than about 10% w/w free fatty acid. As used herein a "free fatty acid" refers to an unesterified fatty acid, i.e., a fatty acid having a carboxylic acid head and a saturated or unsaturated unbranched aliphatic $C_{4-28}$ tail (group). The term "aliphatic" refers to a straight chain, branched chain, cyclic (but non-aromatic), saturated or unsaturated, substituent containing only carbon and hydrogen atoms. Exemplary free fatty acids include arachidic acid, caproic acid, 15 capric acid, caprylic acid, lauric acid, linolenic acid, linoleic acid, myristic acid, oleic acid, palmitic acid, and stearic acid.

In some aspects, the corn oil contains relatively high fatty acid alkyl esters. In some embodiments, the corn oil contains fatty acid alkyl ester in an amount of about 10% w/w or more, for example, about 10% w/w to about 20% w/w, about 12.5% w/w, about 15% w/w, about 17.5% w/w, or about 20% w/w. In some aspects, the corn oil contains about 15% w/w fatty acid alkyl esters. Fatty acid alkyl esters are esterified fatty acids—the fatty acids are esterified during fermentation, for example, with ethanol, and through distillation in a biorefinery. Exemplary fatty acid alkyl esters include fatty acid ethyl esters. Exemplary fatty acid ethyl esters include ethyl linoleate, ethyl linolenate, ethyl oleate, ethyl palmitate, and ethyl stearate.

Provided herein are shingles comprising a base and a coating on the base. The coating comprises an oxidized mixture of asphalt and about 0.1% to about 10% by weight corn oil. In some embodiments, the base is selected from fiberglass sheets, organic felts, ceramic fiber base, and polymer fiber material.

Organic felt mats are made of cellulose fibers obtained from recycled waste paper or wood reduced to a water-based pulp, formed into sheets, dried, cut into strips, and wound onto rolls. Fiberglass sheets are obtained by chopping fine, glass filaments and mixing them with water to form a pulp, which is formed into a sheet. The water is then vacuumed out of the pulp, and a binder is applied to the mat. After curing, the mat is sliced to appropriate widths and rolled. Fiberglass sheets form thinner, lighter shingles with higher resistance to fire.

In some aspects, the asphalt roofing shingle further comprises stone granules. Such granules are applied to the shingle coating, on one or both sides, and can be used for ultraviolet radiation protection, coloration, impact resistance, and/or fire resistance. The granules include inert base particles that are durable, inert inorganic mineral particles, such as stones, copper, andesite, boehmite, coal slag, diabase, metabasalt, nephaline syenite, quartzite, rhyodacite, rhyolite, river gravel, mullite-containing granules, sintered ceramic particles, and/or other suitable materials. The back surface of the shingles can be coated with sand, talc, or fine particles of mica to keep the shingles from sticking together during storage.

The properties of the shingle coating compositions provided herein can be measured by any suitable test known and accepted in the art. In the description provided herein, the coating properties are measured as follows: ASTM D36 (Softening Point), ASTM D5 (Penetration), ASTM D92 (Flash Point), ASTM D2171 (Absolute Viscosity), ASTM D113 (Ductility), ASTM D2042 (Solubility in TCE), ASTM D5147 (Cold Temperature Mandrel bend), ASTM D4402 (Equiviscous temperature), ASTM D2746 (Stain Index), ASTM D4124 (Iatroscan SARA fractionation), ASTM E1252 (Carbonyl Index), ASTM E1252 (Sulfoxide Index), and AASHTO T 313 (Bending Beam Rheometer). In addition, accelerated weathering properties were determined by Xenon Arc Weatherometer according to ASTM G155.

The shingle coating composition can have specifications required by the industry. In some embodiments, the composition has a penetration value of at least about 15 dmm and/or a softening point between about 190° F. and about 235° F. In some aspects, the shingle coating composition has a penetration value of about 17 dmm and/or a softening point of about 211° F. In some aspects the shingle exhibits at least about 10% reduction in mass loss relative to a shingle comprising a coating without corn oil when subjected to accelerated weathering by Xenon Arc Weatherometer according to ASTM G155 for 3000 hours.

The penetration value reflects the adhesion characteristics of the shingle coating composition. Good adhesion permits granules to stick to the shingle without being overly sticky or brittle depending on the temperature. Adhesion is typically measured using the penetration test (ASTM D5) at three temperatures: 41° F., 77° F., and 115° F.

The penetration test comprises heating a shingle coating composition to an appropriate pouring temperature and then pouring the composition into a 3-ounce tin test container. The composition is subjected to a tightly controlled conditioning period, then brought to 77° F. in a temperature-controlled water bath. The sample container is then placed in the penetrometer equipment. A needle of prescribed dimensions is attached to the penetrometer and suspended directly over the coating composition. A 50-gram weight is attached to the needle's loading platform so that the total weight used for loading is 100 grams (50-gram weight plus the needle assembly weight of 50 grams). The penetrometer is lowered until the needle tip just contacts the surface of the composition. The load is then released, allowing the weighted needle to penetrate the shingle coating composition for 5 seconds. The distance that the needle penetrates into the composition is reported as the penetration value and is measured in units of 0.1 millimeters, or decimillimeters (dmm).

The softening point of the shingle coating composition reflects the resistance of the composition to flow at high temperatures means. The coating composition used on the shingle maintains stiffness at temperatures encountered on the roof such that the composition won't slough off the shingle even when exposed to extreme temperatures.

Resistance to flow can be measured using the softening point test such as the Ring & Ball Softening Point test (ASTM D36). The shingle coating composition is poured into two small brass rings, trimmed, and loaded with a steel ball in the center of each ring. After the samples are prepared, the assembly is suspended in a beaker of water, glycerin or ethylene glycol one inch above a metal plate. The liquid is then heated at a rate of 5° C. (9° F.) per minute. As the composition softens, the balls and the asphalt composition gradually sink toward the plate. At the moment the asphalt ball touches the plate, the temperature of the liquid is recorded as the ring-and-ball (R&B) softening point of the shingle coating composition.

Shingle coating compositions typically have softening point temperatures in the range of approximately 190° F. to 221° F.

It has been determined herein that addition of corn oil to asphalt prior to oxidation (also known as blowing) can improve the penetration of the final oxidized mixture while not substantially reducing the softening point. Surprisingly, the use of corn oil as an additive can alter the chemical composition of the oxidized asphalt/oil mixture such that the penetration and softening point relationship changes favorably and in ways not observed with post-oxidation addition of corn oil. In addition, incorporation of corn oil prior to the oxidation process can decrease the viscosity of the shingle coating, significantly improving plant processing relative to post-oxidation addition of a bio-based additive (non-modified vegetable oil or corn oil).

Exemplary specifications of the shingle coating according to the present disclosure include but are not limited to: a penetration value of 15 dmm or higher, a softening point of 190° F. to 235° F., and an equiviscous temperature (EVT) at 125 cP of less than 455° F. or EVT at 75 cP of less than 485° F. (as determined by ASTM D5, ASTM D36, ASTM D4402).

Shingle durability is important since roofing products are subject to extreme temperatures and weather conditions, and the ability for the roofing product to withstand such conditions is essential. Several methods of measuring durability are available, including the weatherometer test, which mimics thermal and UV aging of an asphalt shingle. This test can take 2,000-3,000 hours of continuous operation (or approximately 83-125 days) to characterize the weathering ability of a roofing asphalt.

Methods for making the shingle coating composition and the shingles comprising the compositions are provided herein. In some embodiments, the methods for making the shingle coating composition comprise:
(i) adding about 0.1% to about 10% corn oil to asphalt to form a mixture;
(ii) preheating the mixture to a temperature of about 325° F. to about 350° F.;
(iii) stirring the mixture under low shear (paddle agitation); and
(iv) oxidizing the mixture to a desired softening point.

The asphalt and corn oil can be combined using a mechanical mixer. The mixing may be performed as low shear mixing in the form of blending. In some aspects, the mixture is stirred for about an hour, or about 30 minutes, or about 2 hours. Any sufficient amount of oxidizing time is contemplated herein, as long as the mixture has achieved a desired level of homogeneity.

The shingle coating composition is oxidized according to industry standards, for example, at about 500° F. for about 0.5 to about 10 hours or until desired rheological characteristics are obtained.

Oxidizing is performed to upgrade and achieve desired specifications of an asphalt product. The air blowing process is accompanied by hardening of the asphalt, with corresponding changes in chemical composition: the predominant reactions include polymerization of unsaturated species, dehydrogenation, and condensation.

Proper specification criteria for the shingle coating can depend in part on oxidation time. Insufficient oxidation time can produce a shingle coating with a softening point that is too low, potentially causing bleeding in a finished shingle. If the asphalt/corn oil mixture is oxidized for too long the penetration can be too low resulting in improper binding of granules and/or making the finished shingle susceptible to cracking (thermal splitting). A typical oxidation time for 1% inclusion of corn oil can be about four hours and can be about three hours for 3% corn oil inclusion.

In some aspects, the oxidation can be performed at a temperature in a range of about 300° F. to about 525° F. In some aspects, the step of oxidizing can be performed at about 500° F., for example, or about 480° F., or about 490° F., or about 510° F., or about 520° F., or about 525° F.

Oxidizing is performed by bubbling a gas such as air through heated shingle coating composition, also known as blowing. Oxidation can be performed with air, or in some aspects can be performed with nitrogen, oxygen, carbon dioxide, chlorine, another suitable oxidizing gas, or a combination of these gases. In some aspects, the oxidation can be performed in the absence of air. In some aspects, catalysts are added to elicit certain chemical reactions. $FeCl_3$ is an exemplary catalyst.

The resulting form of the coating composition softens the right amount at the right temperatures to make shingles having desirable qualities. In some aspects, the blown shingle coating composition is further processed by adding a mineral stabilizer such as fly ash or finely ground limestone to make the material more durable and more resistant to fire and weather.

While the oxidizing process is typically performed by blowing air at high temperatures, alternative mechanisms which achieve the same desirable properties are contemplated herein.

Exemplary specifications of the shingle coating composition prepared according to the methods described herein include but are not limited to: a penetration value of 15 dmm or higher, a softening point of about 190° F. to about 235° F., and an equiviscous temperature (EVT) at 125 cP of less than 455° F. or EVT at 75 cP of less than 485° F. (as determined by ASTM D5, ASTM D36, ASTM D4402).

Also provided herein are methods for forming a shingle. The method comprises:
 (i) coating a base with a shingle coating composition comprising an oxidized mixture of asphalt and about 0.1% to about 10% by weight corn oil; and
 (ii) applying granular stone to the shingle coating composition.

The base can be fiberglass sheets, organic felts, ceramic fiber base, or polymer fiber material.

Use of a shingle coating with better rheological properties typically results in a better roofing product in terms of tear strength, bleeding resistance, and weatherability. Addition of corn oil to the asphalt prior to oxidation can improve the rheological properties and hence the corresponding shingle performance.

As described throughout this disclosure, various characteristics of the shingle coating can be more desirable. In some embodiments, the shingle coating composition exhibits a minimum penetration. In some embodiments, the shingle coating composition exhibits a minimum softening point. In some embodiments, the shingle coating composition exhibits both a minimum penetration and softening point. A typical value of a shingle coating composition is a penetration of 17 dmm and softening point of 211° F.

As such, asphalt shingle compositions produced according to the embodiments provided herein can exhibit one or more of the following characteristics: a softening point minimum of 190° F. to 235° F. and a penetration at 77° F. minimum of 15 dmm; or a softening point of 200° F. to 215° F. and a penetration at 77° F. of 16 dmm to 22 dmm; a minimum softening point of 210° F.; a melt viscosity at 400° F. of 150 cps to 450 cps; a durability of greater than 60 cycles in a weatherometer; and/or a flashpoint of greater than 550° F.

While the invention has been particularly shown and described with reference to a number of embodiments, it would be understood by those skilled in the art that changes in the form and details may be made to the various embodiments disclosed herein without departing from the spirit and scope of the invention and that the various embodiments disclosed herein are not intended to act as limitations on the scope of the claims.

EXAMPLES

The following examples are provided such that those of ordinary skill in the art have a complete disclosure and description of how to implement the methods disclosed herein. Efforts have been made to ensure accuracy with respect to numbers used (e.g., amounts, temperature, etc.) but some experimental errors and deviations should be accounted for. Unless indicated otherwise, parts are by weight, molecular weight is average molecular weight, and pressure is at or near atmospheric.

Protocols were performed according ASTM standards and included the following methods:
 ASTM D36 (Softening Point)
 ASTM D5 (Penetration)
 ASTM D92 (Flash Point)
 ASTM D2171 (Absolute Viscosity)
 ASTM D113 (Ductility)
 ASTM D2042 (Solubility in TCE)
 ASTM D5147 (Cold Temperature Mandrel bend)
 ASTM D4402 (Equiviscous temperature)
 ASTM D2746 (Stain Index)
 ASTM D4124 (Iatroscan SARA fractionation)
 ASTM E1252 (Carbonyl Index)
 ASTM E1252 (Sulfoxide Index)
 AASHTO T 313 (Bending Beam Rheometer)

Example 1: Effect of Corn Oil Addition to Asphalt after Asphalt Oxidation on Shingle Coating Properties Corn oil was added to oxidized asphalt at different concentrations (0%, 1%, 2%, and 5%) to evaluate several shingle coating properties compared to control. Results demonstrate that increasing addition of corn oil to the oxidized asphalt increases penetration value (≥13% increase for every 1% inclusion) but lowers the softening point (~3% decrease for every 1% inclusion). Other benefits were observed, including but not limited to: increased ductility, unchanged stain index, lowered viscosity, and improved aging properties. See Table 1.

TABLE 1

Effect of Corn Oil Addition to Asphalt after Asphalt Oxidation on Shingle Coating Properties

| PROPERTIES | | TEST METHODS | RESULTS, % Corn Oil | | | |
|---|---|---|---|---|---|---|
| | | | 0% | 1% | 2% | 5% |
| Original as Blended | | | | | | |
| Softening Pt. (° F.) | | D36 | 203 | 197.5 | 191.5 | 175.5 |
| Viscosity, Pa-s | 375° F. | D4402 | 0.426 | 0.362 | 0.319 | 0.237 |
| | 400° F. | | 0.258 | 0.215 | 0.179 | 0.149 |
| | 425° F. | | 0.161 | 0.136 | 0.118 | 0.099 |
| Penetration (dmm) | 4° C. | D5 | 12 | 13 | 15 | 23 |
| | 25° C. | | 15 | 17 | 20 | 30 |
| | 46° C. | | 29 | 34 | 38 | 66 |

TABLE 1-continued

Effect of Corn Oil Addition to Asphalt after Asphalt Oxidation on Shingle Coating Properties

| PROPERTIES | | TEST METHODS | RESULTS, % Corn Oil | | | |
|---|---|---|---|---|---|---|
| | | | 0% | 1% | 2% | 5% |
| Ductility (cm) | 4° | D113 | 0 | 0 | 0 | 0 |
| | 25° C. | | 3.75 | 4.00 | 4.40 | 5.60 |
| Stain Index | 25 °C. | D2746 | 0 | 0 | 0 | 0 |
| Durability Evaluation via PAV Residue (300 psi, 15 h, 100° C.) | | | | | | |
| Softening Pt. (° F.) | | D36 | 231.5 | 227 | 222.5 | 214.5 |
| Penetration (dmm) | 25° C. | D5 | 10 | 12 | 14 | 17 |
| Viscosity (Pa · s) | 400° F. | D4402 | 0.560 | 0.450 | 0.420 | 0.323 |
| BBR Stiffness, (MPa) | −18° C. | T 313 | 85 | 63 | 47 | 27 |
| m Value | | | 0.279 | 0.288 | 0.307 | 0.339 |
| Durability Evaluation via PAV Residue (300 psi, 25 h, 100° C.) | | | | | | |
| Softening Pt. (° F.) | | D36 | 242 | 240.5 | 232 | 224 |
| Penetration (dmm) | 25° C. | D5 | 10 | 11 | 11 | 16 |
| Viscosity (Pa · s) | 400° F. | D4402 | 0.945 | 0.925 | 0.625 | 0.465 |
| BBR Stiffness (MPa) | −18° C. | T 313 | 88 | 72 | 55 | 31 |
| m Value | | | 0.261 | 0.275 | 0.281 | 0.318 |

Example 2: Effect of Corn Oil Addition to Unoxidized Asphalt

Corn oil was added to unoxidized asphalt at different concentrations (0%, 1%, and 3%) to evaluate softening point, penetration, flash point, and viscosity of the mixture prior to the oxidation step. As with the addition of corn oil to oxidized asphalt, the penetration is increased but the softening point of the mixture is decreased. The flash point is not measurably changed with 1% inclusion, but 3% inclusion decreases the flash point from 590° F. to 580° F. The addition of corn oil also favorably reduces the viscosity of the blends.

TABLE 2

Effect of Corn Oil Addition to Unoxidized Asphalt

| PROPERTIES | | TEST METHODS | RESULTS, % Corn Oil | | |
|---|---|---|---|---|---|
| | | | 0% | 1% | 3% |
| Softening Point, ° F. | | ASTM D36 | 110 | 108 | 102.5 |
| Penetration (dmm) | 4° C. | ASTM D5 | 43 | 55 | 115 |
| | 25° C. | | 140 | 181 | 280 |
| Flash Point, COC, (° F.) | | ASTM D92 | 590 | 590 | 580 |
| Absolute Viscosity (P) | 60° C. | ASTM D2171 | 582 | 457 | 319 |

Example 3: Effect of Corn Oil Addition to Asphalt Exposed to Oxidation as a Mixture Corn oil was added to asphalt at different percent inclusions (0%, 1%, and 3%) and then exposed to oxidation. The asphalt was preheated to 325° F.-350° F. and mixed under low shear (paddle agitation) for 60±5 min. The blend was then transferred to the oxidation still and oxidized to a preselected softening point. The exothermic oxidation reaction was controlled to 500±5° F. The rate of air injected was proportionate to the asphalt charge blown (3,500-4,000 g). The lab air blowing protocols used in this example strongly correlate to what occurs commercially in oxidation time, mass loss, and physical properties.

Figure 1:
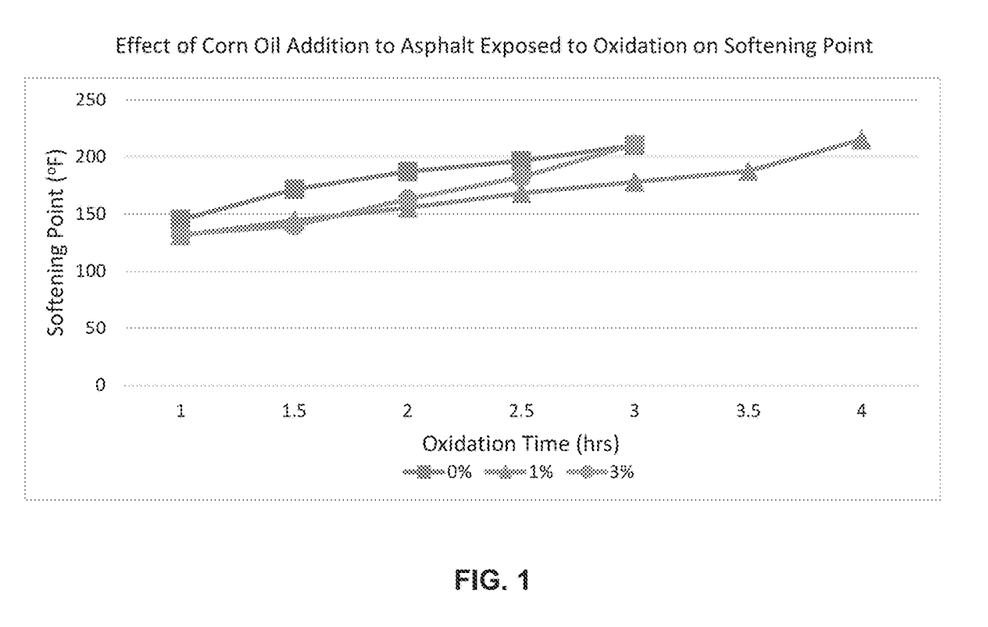
FIG. 1: Effect of Corn Oil Addition to Asphalt on Softening Point: corn oil was added to asphalt at different concentrations (0%, 1%, and 3%) and exposed to oxidation. The starting softening point of the corn oil inclusions is lower but increases over oxidation time. After four hours of oxidation, the 1% inclusion reaches a softening point similar to that as the 0% inclusion at three hours. Similar results are observed with 3% inclusion at three hours.
Figure 2:
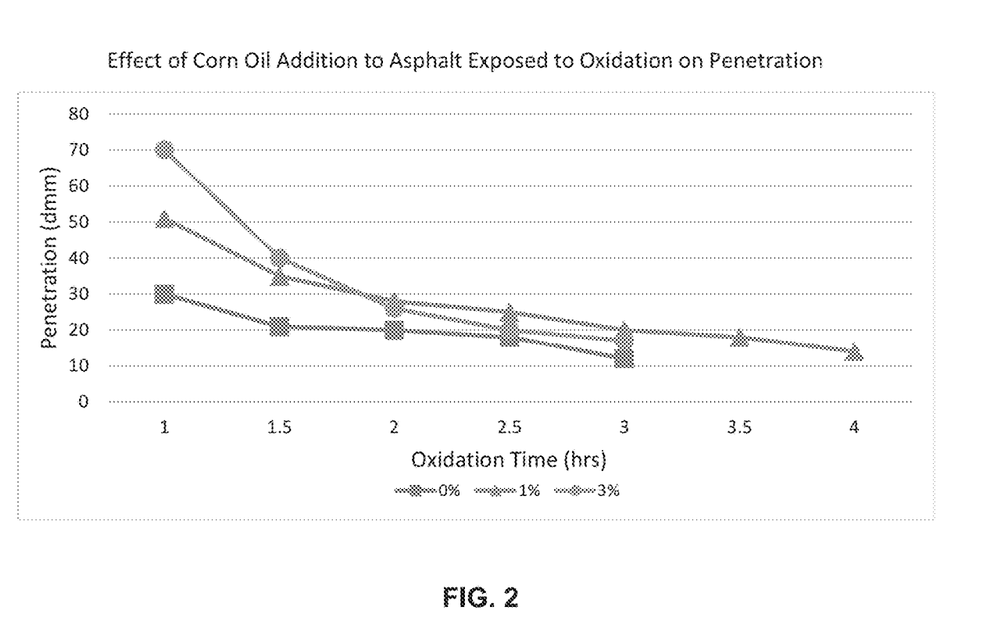
FIG. 2: Effect of Corn Oil Addition to Asphalt on Penetration: corn oil was added to asphalt at different concentrations (0%, 1%, and 3%) and exposed to oxidation. The starting penetration of the corn oil inclusions start higher but is decreased over oxidation time. After four hours of oxidation, the 1% inclusion maintains a higher penetration value to that of the 0% inclusion. A slightly higher penetration value is observed with the 3% inclusion at three hours compared to the 1% after four hours.

The softening point and penetration of the blends were evaluated over oxidation time. Oxidation was ceased once a target softening point of 210° F. or higher was achieved. The softening point and penetration relationship appears to shift favorably at four hours of oxidation for 1% inclusion and three hours of oxidation for 3% inclusion. With the corn oil inclusions in early oxidation time, the softening point results in greater than ~3% reduction for every 1% inclusion and a 40% or greater increase in penetration for every 1% inclusion. However, at the optimal oxidation time for 1% inclusion, the softening point is increased by ~2% and the penetration is increased by ~17%. A 3% inclusion increases softening point by ~0.1% and increases the penetration by ~14%. See Table 3 and FIGS. 1 and 2.

TABLE 3

Corn Oil - Asphalt Mixture Exposed to Oxidation

| | Results, % Corn Oil | | | | | | | | |
|---|---|---|---|---|---|---|---|---|---|
| | 0% | | | 1% | | | 3% | | |
| Time (hrs) | TEMP (° F.) | SP (° F.) | PEN 77° F. (dmm) | TEMP (° F.) | SP (° F.) | PEN 77° F. (dmm) | TEMP (° F.) | SP (° F.) | PEN 77° F. (dmm) |
| 1.0 | 498 | 145 | 30 | 500 | 131.2 | 51 | 493 | 132 | 70 |
| 1.5 | 490 | 171.6 | 21 | 500 | 144.3 | 35 | 492 | 139.8 | 40 |
| 2.0 | 490 | 187 | 20 | 498 | 155.4 | 28 | 490 | 163.1 | 26 |
| 2.5 | 499 | 196.5 | 18 | 498 | 168.2 | 25 | 498 | 182.3 | 20 |

TABLE 3-continued

Corn Oil - Asphalt Mixture Exposed to Oxidation

Results, % Corn Oil

| | 0% | | | 1% | | | 3% | | |
|---|---|---|---|---|---|---|---|---|---|
| Time (hrs) | TEMP (° F.) | SP (° F.) | PEN 77° F. (dmm) | TEMP (° F.) | SP (° F.) | PEN 77° F. (dmm) | TEMP (° F.) | SP (° F.) | PEN 77° F. (dmm) |
| 3.0 | 500 | 210 | 12 | 500 | 178 | 20 | 491 | 210.8 | 17 |
| 3.5 | — | — | — | 497 | 187.5 | 18 | — | — | — |
| 4.0 | — | — | — | 500 | 215 | 14 | — | — | — |

Properties of the shingle coatings produced at various corn oil concentrations (0%, 1%, and 3%) in asphalt exposed to oxidation are shown in Table 4. Tested properties include softening point, ductility, flash point, solubility, cold temperature Mandrel Bend, viscosity profile, and stain index. Results indicate multiple benefits of corn oil inclusions, most notably a higher penetration value with similar softening point and lower EVT.

SARA fractionation of the produced shingle coatings demonstrates that the asphalt component composition is changed with inclusion of corn oil prior to oxidation. As can be seen, the asphalt is chemically modified as the composition is altered beyond what would be expected from corn oil contribution alone at such low percentage inclusions.

TABLE 4

Properties of Final Shingle Coatings after Optimal Oxidation Time

| PROPERTIES | | ASTM TEST METHODS | ASTM D312 SPECS | RESULTS, % Corn Oil | | |
|---|---|---|---|---|---|---|
| | | | | 0% | 1% | 3% |
| Softening Point (° F.) | | D36 | 210-225 | 210 | 215 | 210.8 |
| | 0° C. | | 6 min. | 10 | 10 | 11 |
| | 4° C. | D5 | Report | 8 | 11 | 12 |
| | 25° C. | | 25-Dec | 12 | 14 | 17 |
| Ductility (cm) | 25° C. | D113 | 1.5 min. | 3 | 3 | 3 |
| Flash Point COC (° F.) | | D92 | 575 min. | >590 | 590 | 585 |
| Solubility$_{TCE}$ (%) | | D2042 | 99.0 min. | 99.97 | 99.99 | 99.95 |
| Cold Temperature Mandrel Bend (° C.) | | D5147 | Report | 25 | 25 | 25 |
| | 375° F. | | Use to determine | 1.265 | 0.655 | 0.41 |
| | 400° F. | | | 0.58 | 0.425 | 0.265 |
| ViscosityProfile (Pa-s), unfilled | 425° F. | D4402 | EVT at 125 cP and 75 cP | 0.35 | 0.315 | 0.155 |
| EVT at 125cP (° F.) | | | 455 max. | 433 | 450 | 430 |
| EVT at 75 cP (° F.) | | | 485 max. | 436 | 457 | 439 |
| Stain Index | | D2746 | Report | 0 | 0 | 0 |

Example 4: Chemical Analysis

Shingle coatings were produced according to Example 3 and subjected to SARA fractionation. The sample containing the four defined fractions was first separated into alkane-insoluble asphaltenes and alkane-soluble petrolenes. Petrolenes were then adsorbed onto calcined CG-20 alumina and further fractionated into saturate, naphthene aromatic, and polar aromatic fractions by pumping an eluotropic series of elution solvents upwards through a glass chromatographic column packed with calcined alumina. Eluted fractions were recovered by solvent removal prior to final weighing. The three eluted fractions plus the alkane precipitated asphaltenes contained saturates, naphthene aromatics, polar aromatics, and iso-octane insoluble asphaltenes. Carbonyl and sulfoxide indices were obtained according to ASTM E1252.

TABLE 5

Composition Properties of Oxidized Coatings with and without Corn Oil

| PROPERTIES | | ASTM Test Methods | Results, Trial # | | |
|---|---|---|---|---|---|
| | | | -00 (0%) | -01 (1% Corn Oil) | -02 (3% Corn Oil) |
| SARA Component Fractions, Wt. % | Saturates | D4124 by Iatroscan | 4.8 | 6.7 | 10.8 |
| | Naphthene Aromatics | | 42.2 | 35.5 | 33.3 |
| | Polar Aromatics | | 21.4 | 25.2 | 26.7 |
| | Asphaltenes | | 31.6 | 32.7 | 29.2 |
| | IC* | | 0.57 | 0.65 | 0.67 |
| Carbonyl Index | | EI1252 | 0.01 | 0.16 | 0.17 |
| Sulfoxide Index | | EI1252 | 0.05 | 0.13 | 0.13 |

*Colloidal instability ($I_C$) is the ratio of (saturates + asphaltenes)/(resins + aromatics)

Example 5: Accelerated Weathering

Figure 3:
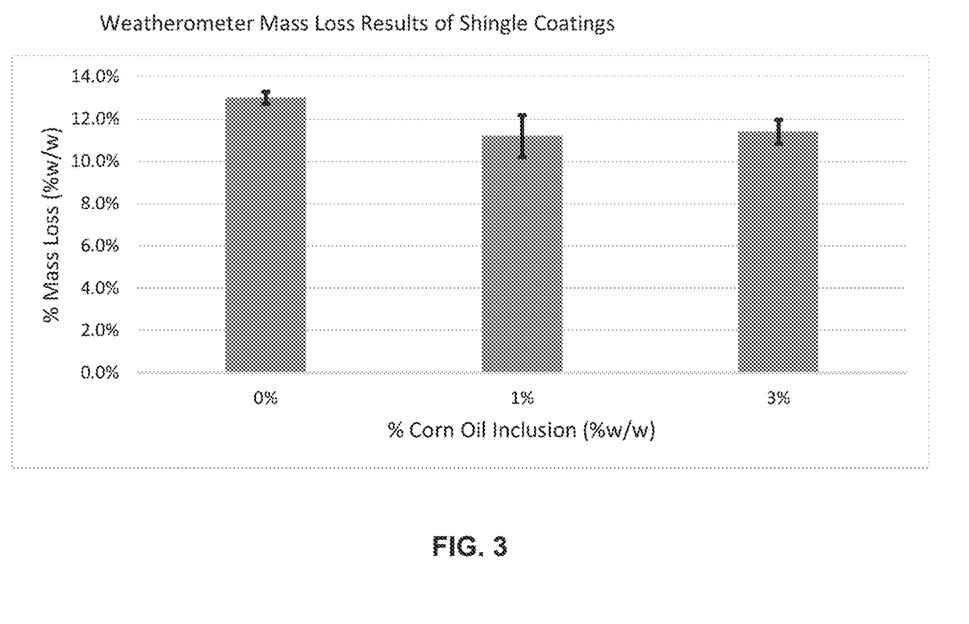
FIG. 3: Weatherometer Mass Loss Results of Shingle Coatings: Panels generated from shingle coating produced at 0%, 1%, and 3% addition of corn oil prior to oxidation were exposed to accelerated weathering by Xenon Arc Weatherometer according to ASTM G155 for 3000 hours. Results indicated no pinholes or cracks in any of the samples but an approximate 14.9% reduction in mass loss for 1% and 13.1% reduction for 3% corn oil containing shingle coatings. The average of two panels is shown for each sample type.

Shingle coatings were produced according to Example 3 and subjected to accelerated weathering. No pinholes or cracks were detected in any of the samples but, surprisingly, the data show an approximate 14.9% reduction in mass loss for 1% and 13.1% reduction in mass loss for 3% corn oil containing shingle coatings. See FIG. 3.

What is claimed is:

1. A shingle coating composition comprising an oxidized mixture of asphalt and about 0.1% to about 10% by weight corn oil, wherein the corn oil is obtained as a byproduct of fermentation and includes less than about 15% w/w of free fatty acids and about 10% w/w to about 20% w/w of fatty acid alkyl esters and wherein the corn oil is added to the asphalt prior to oxidation.

2. A shingle comprising a base and a coating on the base, the coating comprising an oxidized mixture of asphalt and about 0.1% to about 10% by weight corn oil, wherein the corn oil is obtained as a byproduct of fermentation and includes less than about 15% w/w of free fatty acids and about 10% w/w to about 20% w/w of fatty acid alkyl esters and wherein the corn oil is added to the asphalt prior to oxidation.

3. The shingle of claim 2, wherein the base is selected from the group consisting of fiberglass sheets, organic felts, ceramic fiber base, or polymer fiber material.

4. The shingle of claim 2, wherein the coating has a penetration value of at least about 15 dmm.

5. The shingle of claim 2, wherein the coating has a softening point between about 190° F. and about 235° F.

6. The shingle of claim 2, wherein the coating has a penetration value of about 17 dmm and softening point of about 211° F.

7. The shingle of claim 2, wherein the coating exhibits a reduced viscosity relative to a shingle coating composition without corn oil.

8. The shingle of claim 2, wherein the flashpoint of the coating is reduced no more than about 10% relative to a coating without corn oil.

9. The shingle of claim 2, wherein the flashpoint of the coating is reduced no more than about 5% relative to a coating without corn oil.

10. The shingle coating composition of claim 1, wherein the coating composition includes about 0.1 to about 5% w/w of the free fatty acids.

11. The shingle coating composition of claim 10, wherein the free fatty acids include arachidic acid, caproic acid, capric acid, caprylic acid, lauric acid, linolenic acid, linoleic acid, myristic acid, oleic acid, palmitic acid, stearic acid, and combinations thereof.

12. The shingle coating composition of claim 1, wherein the fatty acid alkyl esters include fatty acid ethyl esters.

13. The shingle coating composition of claim 12, wherein the fatty acid ethyl esters include ethyl linoleate, ethyl linolenate, ethyl oleate, ethyl palmitate, ethyl stearate, and combinations thereof.

14. The shingle coating composition of claim 1, wherein the coating has a penetration value of at least about 15 dmm, a softening point of about 190° F. to about 235° F., and a melt viscosity at 400° F. of 150 cps to 450 cps.

15. The shingle coating composition of claim 14, wherein the mixture includes about 1 to about 3% by weight of the corn oil.

16. The shingle coating composition of claim 1, wherein the mixture of asphalt and corn oil is oxidized with nitrogen oxygen, carbon dioxide, chlorine, or combination thereof without use of a catalyst.

17. A method for forming a shingle, the method comprising:
(i) coating a base with a shingle coating composition comprising an oxidized mixture of asphalt and about 0.1% to about 10% by weight corn oil, wherein the corn oil is obtained as a byproduct of fermentation and includes less than about 15% w/w of free fatty acids and about 10% w/w to about 20% w/w of fatty acid alkyl esters and wherein the corn oil is added to the asphalt prior to oxidation; and
(ii) applying granular stone to the shingle coating composition.

18. The method of claim 17, wherein the base is selected from the group consisting of fiberglass sheets, organic felts, ceramic fiber base, or polymer fiber material.

19. The method of claim 17, wherein the shingle exhibits a reduction in mass loss relative to a shingle comprising a coating without corn oil when subjected to accelerated weathering by Xenon Arc Weatherometer according to ASTM G155 for 3000 hours.

* * * * *